United States Patent [19]

Birchall et al.

[11] Patent Number: 4,950,626

[45] Date of Patent: * Aug. 21, 1990

[54] PRODUCTION OF CERAMIC MATERIALS

[75] Inventors: James D. Birchall, Mouldsworth; Mary J. Mockford, Upton; David R. Stanley, Kuntsford, all of United Kingdom

[73] Assignee: Imperial Chemical Industries PLC, London, England

[*] Notice: The portion of the term of this patent subsequent to Aug. 29, 2006 has been disclaimed.

[21] Appl. No.: 113,159

[22] Filed: Oct. 27, 1987

[30] Foreign Application Priority Data

Oct. 31, 1986 [GB] United Kingdom ............... 8626088

[51] Int. Cl.$^5$ ............................................. C04B 35/00
[52] U.S. Cl. ...................................... 501/88; 501/59; 501/96; 501/102; 501/128; 501/153; 501/154; 423/397; 423/276; 423/324; 423/132; 423/111; 528/8; 528/29; 528/39
[58] Field of Search ............... 501/96, 102, 126, 127, 501/128, 132, 153, 154, 88, 89; 528/8, 29, 39; 423/289, 297, 344, 276, 324, 137, 111

[56] References Cited

U.S. PATENT DOCUMENTS

| | | | |
|---|---|---|---|
| Re. 32,107 | 4/1986 | January | 501/12 |
| 2,697,029 | 12/1954 | Baker et al. | |
| 3,855,395 | 12/1974 | Cutler | |
| 4,266,978 | 5/1981 | Prochazka | 106/39.5 |
| 4,396,587 | 8/1983 | Yamaguchi et al. | |
| 4,422,965 | 12/1983 | Chickering et al. | 252/629 |
| 4,595,545 | 6/1986 | Sane | 264/65 |
| 4,622,215 | 11/1986 | Janey | |

FOREIGN PATENT DOCUMENTS

| | | |
|---|---|---|
| 38632 | 10/1981 | European Pat. Off. |
| 42660 | 12/1981 | European Pat. Off. |
| 115745 | 8/1984 | European Pat. Off. |
| 156491 | 10/1985 | European Pat. Off. |
| 239301 | 9/1987 | European Pat. Off. |
| 284235 | 9/1988 | European Pat. Off. |
| 2747016 | 10/1977 | Fed. Rep. of Germany |
| 53-72020 | 6/1978 | Japan |
| 57-17412 | 10/1981 | Japan |
| 1173993 | 12/1969 | United Kingdom |
| 2172276 | 9/1986 | United Kingdom |

OTHER PUBLICATIONS

Translation of Japanese Pat. No. 57-17412, published 1-29-82.
Chemical Abstract 96:201996k.
Chemical Abstraction 104(1986), Mar, No. 12, Columbia, Ohio.
"Preparation of Silicon Nitride from Silica", Shi-Chang Zhang and W. Roger Cannon, The American Societ, Cambridge, Mass., Sep. 15, 1982, Paper No. 132BE-82F) Revised 4-30-84.
Thermochemica Acta, 81 (1984), pp. 77-86.
Yajima et al., Chem. Lett., 1975, pp. 931-934.
Yajima, Nature, 1978, vol. 273, pp. 525-527.

Primary Examiner—Brian E. Hearn
Assistant Examiner—Andrew Griffis
Attorney, Agent, or Firm—Cushman, Darby & Cushman

[57] ABSTRACT

A process for the production of a refractory compound, e.g. a carbide or nitride, of a metallic or non-metallic element, by reacting a mixture of a compound of the metallic or non-metallic element having at least two groups reactive with hydroxyl groups and an organic compound having at least two hydroxyl groups to produce an oxygen-containing polymeric product, and pyrolysing the polymeric product, e.g. in an inert atmosphere to produce a carbide or in an atmosphere of reactive nitrogen compound to produce a nitride, in which the reaction mixture contains an aluminium compound containing at least one group reactive with hydroxyl groups.

The presence of the aluminium compound in the reaction mixture leads to an increase in the proportion of carbon in the product initially produced by pyrolysis, and to a higher purity in the refractory compound which is ultimately produced.

15 Claims, No Drawings

PRODUCTION OF CERAMIC MATERIALS

This invention relates to a process for the production of ceramic materials and in particular to a process for the production of a refractory compound, e.g. a carbide or a nitride of a metallic or non-metallic element, for example, a carbide or a nitride of boron, silicon, zirconium, titanium, hafnium, tantalum or tungsten.

Particles of refractory carbides have traditionally been produced by the so-called carbothermic reaction in which an intimate mixture of carbon and an oxide of the metallic or non-metallic element is heated in an inert atmosphere. For example, in the production of silicon carbide an intimate mixture of carbon and silica is reacted according to the overall equation $$SiO_2 + 3C \rightarrow SiC + 2CO.$$

The problems associated with the carbothermic reaction are illustrated by the problems associated with the production of silicon carbide. Thus, in the production of silicon carbide an intimate mixture of carbon and silica is fired in an inert atmosphere at a temperature which may be as high as 2500° C., the firing being effected in an electric furnace. In this process the required stoichiometric proportion of silica to carbon may readily be achieved, that is, three moles of carbon for every mole of silica, i.e. 37.5 weight per cent of carbon and 62.5 weight per cent of silica. However, the process suffers from a problem in that it is difficult to achieve the necessary intimate contact between the carbon and the silica in order that a product of uniform composition may be produced, that is of uniform composition on a molecular scale. In particular, the particles which are produced, which are nominally silicon carbide, may be contaminated with unreated silica and/or carbon. This is the case even when very small particles of silica and carbon are used, for example silica sol and carbon black. Furthermore, in this traditional process it is also difficult to produce particles of silicon carbide having a very small size, e.g. a size of less than 1 micron.

Where an excess of carbon over the theoretically required stoichiometric proportion is used the silicon carbide product may be contaminated with carbon, and where a deficiency of carbon over the stoichiometric proportion is used the silicon carbide product may be contaminated with unreacted silica.

Particles of refractory nitrides may also be produced by a similar process which may be illustrated by the production of silicon nitride. Thus, silicon nitride may be produced by the so-called silica reduction process in which silica is reacted with carbon to reduce the silica and the reduced product is reacted with nitrogen according to the overall equation $$3SiO_2 + 6C + 2N_2 \rightarrow Si_3N_4 + 6CO.$$

In this process an intimate mixture of silica and carbon is fired at a temperature in the region of 1300° C. to 1400° C. in an atmosphere containing nitrogen. In the process the required stoichiometric molar proportion of silica to carbon, 1:2, may readily be achieved. However, the process suffers from a similar problem to that associated with the production of silicon carbide in that it is difficult to achieve the necessary intimate contact between the carbon and the silica in order that a silicon nitride product of uniform composition may be produced, that is of uniform composition on a molecular scale. In particular, the particles which are produced, which are nominally silicon nitride, may be contaminated with unreacted silica and/or carbon. This is the case even when very small particles of silica and carbon are used, for example silica sol and carbon black. Furthermore, in this process it is also difficult to produce particles of silicon nitride having a very small size, e.g. a size of less than 1 micron.

Where an excess of carbon over the theoretically required stoichiometric proportion is used the silicon nitride product may be contaminated with carbon, and where a deficiency of carbon over the stoichiometric proportion is used the silicon nitride product may be contaminated with unreacted silica.

A recent development, which is described in Thermochimica Acta, 81 (1984) 77–86, is the production of silicon carbide by the pyrolysis of rice hulls. Rice hulls consist of silica and cellulose, which yields a mixture of silica and carbon when thermally decomposed. Rice hulls have a very high surface area and this, together with the intimate contact between the carbon and silica in the thermally decomposed rice hulls, enables silicon carbide to be formed by subsequent pyrolysis at relatively low temperatures. Production may be effected in a two-step process in which rice hulls are coked by heating in the absence of air at a relatively low temperature, e.g. at 700° C., in order to decompose the cellulose into amorphous carbon, and in which the thus coked rice hulls are heated at a high temperature, e.g. at a temperature of greater than 1500° C. and in an inert or reducing atmosphere to produce silicon carbide.

Silicon nitride may also be produced from rice hulls by reacting rice hulls with nitrogen at an elevated temperature. Such a process is described in U.S. Pat. No. 3,855,395, the process comprising the steps of heating rice hulls in an oxygen-free atmosphere to a temperature within the range 1100° C. to 1350° C. and exposing the heated rice hulls to gaseous nitrogen until the silica in the rice hulls is changed to silicon nitride. Production may be effected in a two-step process in which rice hulls are coked by heating in the absence of air at a relatively low temperature, e.g. at 700° C., in order to decompose the cellulose into amorphous carbon, and in which the thus coked rice hulls are heated at a high temperature, e.g. at a temperature of the order of 1300° C., and in an atmosphere of nitrogen to produce silicon nitride.

It has also been proposed to produce refractory carbides such as silicon carbide by pyrolysis of organic polymeric materials which contain the elements of the ceramic material, that is silicon and carbon in the case of silicon carbide, but which do not contain oxygen. In such a process the polymeric material is first coked to convert the organic component of the polymeric material to carbon, and the carbon and silicon are then reacted in a pyrolysis reaction. This is not the traditional carbothermic reaction in which carbon and silica are reacted. The objective of using such a polymeric material is to achieve in a coked product produced from the polymeric material a more intimate mixture of the elements of the ceramic material, such as silicon and carbon, than can be achieved, for example in the case of silicon carbide, by mixing particulate silica and carbon. However, the proportion of carbon to silicon in the coked product may be very different from that theoretically required with a consequent severely adverse effect on the purity of the silicon carbide which is produced.

An early example of such a polymeric material is provided by U.S. Pat. No. 2,697,029 in which there is described the production of a polymeric material by copolymerisation of a silyl substituted monomer, e.g. trimethylsilyl styrene, and another monomer, e.g. divinyl benzene or ethyl vinyl benzene, to give a cross-linked resin, and pyrolysis of the resin to give a solid containing carbon and silicon.

Further examples of such polymeric materials are the carbosilanes produced by the pyrolysis of dodecamethylcyclohexasilane (Yajima et al Chem. Lett. 1975, p931) and by heating poly(dimethylsilane) in an autoclave (Yajima 1976 Nature v.273, p525). These carbosilanes may be melt spun to fibrous materials from which refractory silicon carbide may be produced by heating at high temperature. The reaction which is effected at high temperature is between the silicon and carbon and it is not the traditional carbothermic reaction, that is the reaction between silica and carbon, referred to previously. This process suffers from the disadvantage that the silicon carbide product is impure.

A more recent example of a material from which a refractory carbide may be produced is provided in Japanese Patent Publication No. 57-17412 in which there is described a process in which a halogen compound or an alkoxide of silicon, vanadium, zirconiun, tantalum or tungsten is reacted with a carbohydrate and the resultant reaction product is fired. The halogen compound or alkoxide may be, for example, $SiCl_4$, $ZrOCl_2$, $Si(OC_2H_3)_4$, $Si(OC_2H_5)_3C_2H_5$, $Si(OC_2H_5)_2(CH_3)_2$, $Zr(OC_4H_9)_4$, $WCl_2(OC_2H_5)_4$, and the carbohydrate may be, for example, a monosaccharide or a polysaccharide, e.g. glucose, galactose, arabinose, starch, or cellulose. The coked reaction product produced by firing comprises a mixture of silica and carbon. However, the proportion of carbon to silica in the coked reaction product may be very different from that theoretically required to produce silicon carbide which is at most only slightly contaminated with silica or carbon.

Similarly, an intimate mixture of silica and carbon may be formed by pyrolysing in an inert atmosphere an organic polymeric material which contains the elements silicon, oxygen and carbon, and the thus formed coked product may be heated in a nitrogen- containing atmosphere to produce silicon nitride. However, the proportion of silica to carbon in the mixture may not be that which is required, and indeed it may be far removed from the proportion which is theoretically required, with the result that the silicon nitride which is produced may not have the required purity and may be severely contaminated with silica or carbon.

Refractory carbides and nitrides have been used for many years in such applications as abrasives and in the manufacture of tools. Whereas in these applications the quality of the refractory carbide or nitride might not have been of critical importance there are other applications of refractory carbides or nitrides which are of more recent development where the quality of the carbide or nitride and its physical form may be of critical importance. These more recently developed applications of refractory carbides or nitrides include applications as engineering materials and uses in electronic applications.

The present invention provides a process for the production of a refractory compound of a metallic or non-metallic element which process is adapted to produce a compound of uniform quality and composition and which is substantially free of impurities. The process of the invention is adapted to control, and in particular to increase, the proportion of carbon to oxide of a metallic of non- metallic element in a coked reaction product produced by pyrolysis of an organic polymeric material, and to produce a proportion of carbon to oxide of a metallic or non-metallic element in such a coked reaction product which is close to the proportion which is theoretically required for the production of a refractory compound in pure form.

According to the present invention there is provided a process for the production of a refractory compound of a metallic or non-metallic element which process comprises producing an oxygen-containing polymeric product by reacting a mixture of a first reactant which comprises at least one compound of the metallic or non-metallic element having two or more groups reactive with hydroxyl groups and a second reactant which comprises at least one organic compound having two or more hydroxyl groups, and pyrolysing the polymeric product, and in which the reaction mixture comprises at least one aluminium compound having at least one group reactive with hydroxyl groups.

The refractory compound which is produced in the process of the invention may be a carbide or a nitride, but the process is not limited to the production of carbides and nitrides. For example, the refractory compound may be a boride or silicide of a metallic or non-metallic element. Where a refractory compound which is a boride or silicide is to be produced the oxygen-containing polymeric product is produced by reacting a mixture of first reactant which comprises a compound of the metallic or non-metallic element having two or more groups reactive with hydroxyl group and a compound of boron or silicon having two or more groups reactive with hydroxyl groups, and a second reactant which comprises at least one organic compound having two or more hydroxyl groups. The refractory boride or silicide is produced by heating the polymeric product in an inert atmosphere. In the case where a refractory carbide or nitride of a metallic or non-metallic element is to be produced an oxygen-containing polymeric product is produced by reacting a mixture of a first reactant which comprises a compound of the metallic or non-metallic element having two or more groups reactive with hydroxyl groups and a second reactant which comprises at least one organic compound having two to more hydroxyl groups. The polymeric product is then pyrolysed, in an inert atmosphere where a carbide of the metallic or non-metallic element is to be produced, or in an atmosphere of a reactive nitrogen compound where a nitride of the metallic or non- metallic element is to be produced.

In the production of a refractory compound which is a carbide or nitride, or a boride or silicide, the pyrolysis stage may itself be effected in two stages. In the first of these stages, which may be referred to as a coking stage, the oxygen-containing polymeric product may be heated, in an inert atmosphere, in order to decompose the organic component of the polymeric product to carbon. The coked product which is produced in this coking stage will be a mixture of carbon and an oxide of the metallic or non-metallic element, and an oxide of boron or silicon in the case where a boride or silicide is to be produced.

The temperature at which heating is effected in the coking state will depend on the nature of the organic component of the polymeric product but in general a temperature of up to 600° C. will suffice, although a higher temperature may be used, e.g. a temperature up to about 800° C. or even higher. The heating should be effected for a time sufficient for the organic component of the polymeric product to become substantially fully carbonised, for example, for a time sufficient for there to be no further loss in weight of the product at the chosen temperature.

In the second stage of pyrolysis the product of the coking stage is heated to a temperature above that at which the coking stage was effected in order to effect a carbothermic reaction between the carbon and the oxide of the metallic or non-metallic element, and the oxide of boron or silicon if present. A temperature of up to about 1200° C may suffice, although a higher temperature may be used, and the heating should be effected in an inert atmosphere, for example of an inert gas, e.g. helium, where a carbide, boride or silicide of the metallic or non-metallic element is to be produced by the carbothermic reaction, or the heating should be effected in an atmosphere of a reactive nitrogen compound, for example nitrogen itself or ammonia, where a nitride of the metallic or non-metallic element is to be produced.

The benefit provided by the process of the invention is that the presence of a compound of aluminium in the mixture from which the polymeric product is produced results in an increase in the proportion of carbon to oxide of the metallic or nonmetallic element in the coked reaction product produced by pyrolysis of the polymeric product, even where the amount of the compound of aluminium is relatively low, and furthermore the proportion of carbon in the coked reaction product may be controlled by variation of the proportion of the compound of aluminium in the mixture from which the polymeric product is produced.

In the process of the invention the first reactant comprises a compound of a metallic or non-metallic element having two or more groups reactive with hydroxyl groups. The first reactant will be a compound of an element other than aluminium, as an aluminium compound is present in order to increase and control the proportion of carbon to oxide of the metallic or non-metallic element in the coked reaction product produced by pyrolysis of the oxygen-containing polymeric product.

The metallic or non-metallic element will be an element which is capable of forming a refractory compound and examples of such elements are silicon, titanium, tantalum, zirconium, hafnium, tungsten, chromium, iron, uranium, boron, lanthanum and other rare earth elements although the process is not limited to use with compounds of these specific elements. The compound of the metallic or non-metallic element comprises at least two groups reactive with hydroxyl groups, and it may in addition comprise groups which are not so reactive. For example, the compound may have a formula $MX_nY_m$ where X is a group which is reactive with hydroxyl groups and Y is a group which is not reactive with hydroxyl groups, n is an integer of at least 2, and m is zero or an integer. The group X may be, for example, halide, e.g. chloride or bromide; amide; alkoxy, e.g. a group of the formula OR where R is an alkyl group having for example from 1 to 8 carbon atoms. e.g. methoxy, ethoxy or butoxy, or an ester group, e.g. acetoxy or propionoxy. The group Y, if present in the compound of the metallic or non-metallic element, may be, for example, a hydrocarbyl group, e.g. alkyl, cycloalkyl, aryl or alkaryl. Specific examples of such groups include, methyl, ethyl, propyl, cyclohexyl and benzyl. The group Y may be an oxy group, for example, the compound of the metallic or non-metallic element may be an oxyhalide.

Compounds of the metallic or non-metallic element in which all the groups are reactive with hydroxyl groups are preferred as such compounds are generally easier to prepare, and furthermore when the compound contains three or more such groups its use leads to desirable cross-linking in the polymeric product. Specific examples of compounds of metallic or non-metallic elements in which all of the groups therein are reactive with hydroxyl groups are tetramethoxysilane, tetraethoxysilane, tetraethoxy zirconium, pentaethoxy tantalum, penta-n-propoxy tantalum, silicon tetrachloride, silicon tetrabromide, titanium tetrachloride, zirconium tetrachloride, dichlorodiethoxy silane, chlorotriethoxy zirconium, dichlorotributoxy tantalum, boron trichloride and boron triisopropoxide.

Examples of compounds of metallic or nonmetallic elements which comprise groups which are, and groups which are not, reactive with hydroxyl groups include methyltrimethoxysilane, methyltriethyoxysilane, ethyltriethoxysilane, dimethyldiethoxysilane, dimethyldimethoxysilane and silicon oxychloride, and equivalent compounds of other metallic or non-metallic elements.

In general the compound of the metallic or non-metallic element will not comprise hydroxyl groups as hydroxyl group-containing compounds of metallic or non-metallic elements which are capable of forming a refractory carbide or nitride are generally unstable, or they may not even exist as hydroxides, or they may readily condense to form a polymeric product, or they may exist as a hydrated oxide rather than as a hydroxide. However, the possibility of using such compounds is not excluded.

The first reactant may comprise more than one compound of a metallic or non-metallic element having two or more groups reactive with hydroxyl groups.

When a refractory compound is to be produced which is a boride of a metallic or non-metallic element then the latter element will be an element other than boron, and similarly, where a refractory compound is to be produced which is a silicide of a metallic or non-metallic element then the later element will be an element other than silicon. Suitable compounds of boron and silicon which may form part of the first reactant in the mixture from which the oxygen-containing polymeric product may be produced have been described above.

The reaction mixture comprises as a second reactant at least one organic compound having two or more hydroxyl groups. The organic compound may be, for example, aliphatic or cycloaliphatic. Examples of suitable aliphatic organic compounds containing two hydroxyl groups include glycols, e.g. ethylene glycol, propylene glycol, butylene glycol and diethylene glycol. Examples of suitable aliphatic organic compounds containing more than two hydroxyl groups include glycerol, trihydroxy butane and trihydroxy pentane. Examples of cycloaliphatic organic compounds containing at least two hydroxyl groups include dihydroxycyclohexane and trihydroxycyclohexane. Aromatic organic compounds which comprise two or more hydroxyl groups may be used as a part of the second reactant but their use is not to be recommended as we find that where the reaction mixture contains such a compound the benefit provided by the presence of an aluminium compound in the reaction mixture is much decreased, particularly where the reaction mixture contains a substantial proportion of such an aromatic organic compound. For the same reason the use of organic compounds containing two or more hydroxyl groups and also containing ethylenic unsaturation is not recommended. For the same reason the use of metallic or non-metallic compounds containing aromatic groups or ethlenically unsaturated groups as, or as part of, the first reactant is not recommended.

The second reactant may comprise more than one organic compound containing two or more hydroxyl groups, and the second reactant may comprise substituent groups other than hydroxyl groups.

The reaction mixture comprises at least one aluminium compound having at least one group reactive with hydroxyl groups. The reaction mixture may comprise more than one such aluminium compound. Suitable reactive groups include, halide, e.g. chloride or bromide, and alkoxy, e.g. methoxy, ethoxy, propoxy, and isopropoxy. All of the groups in the aluminium compound may be reactive with hydroxyl groups, and examples of such compounds include aluminium chloride, aluminium bromide, aluminium tri-ethoxide, and aluminium tri-isopropoxide.

Alternatively, the aluminium compound may contain groups which are not reactive with hydroxyl groups, and an example of such a compound is aluminium oxychloride.

As reaction between the compound of the metallic or non-metallic compound, the aluminium compound, and the organic compound containing hydroxyl groups, is in the nature of a condensation polymerisation the proportions of the reactants will be chosen to achieve the required condensation, and there may be little scope for variation in the proportions of the reactants. Thus, the proportion of the reactants chosen will depend on the number of groups reactive with hydroxyl groups in the metallic or non-metallic compound and in the aluminium compound and on the number of hydroxyl groups in the organic compound. The relative proportions of the reactants may be chosen such that in the reaction mixture there is an approximately equimolar proportion of hydroxyl groups to groups reactive with hydroxyl groups. For example, where tetraethoxy-silane, which contains four reactive groups, is reacted with glycerol, which contains three reactive groups, the reaction is a transesterification in which ethanol is eliminated and for a polymeric product of reasonably high molecular weight to be produced the molar proportion of tetraethoxysilane to glycerol which is chosen may be in the region of 3:4. However, an excess of one reactant over the others may be chosen in order to force reaction towards completion.

The proportion of aluminium compound in the reaction mixture may be surprisingly small yet it may still have a significant effect on the proportion of carbon in the coked product produced by pyrolysis of the oxygen-containing polymeric product. Thus, the proportion of the aluminium compound may be as low as 0.1%, expressed as the percentage of aluminium in the compound thereof by weight of the metallic or non-metallic element in the compound thereof. The proportion of aluminium compound will generally be not more than 10% by weight, and a preferred proportion is in the range 0.5 to 5.0% by weight.

The proportion of carbon in the coked product may be varied, and controlled, by variation of the proportion of aluminium compound in the reaction mixture. In general, the greater the proportion of aluminium compound in the reaction mixture the greater the proportion of carbon to oxide of the metallic or non-metallic element in the coked product produced by pyrolysis of the oxygen-containing polymeric product. However, there may be little or no additional benefit to be gained by using excessive proportions of aluminium compound, and it is preferred to use no more than the amount of aluminium compound which is needed to result in the required proportion of carbon to oxide of the metallic or non-metallic element in the coked product.

The conditions under which the compound of the metallic or non-metallic element, the aluminium compound, and the organic compound in the reaction mixture are reacted will depend on the nature of the compounds and possibly on whether or not a solvent for the compounds is used. It is desirable, in order to assist in the production of a polymeric product of uniform composition, that the reaction mixture of the compounds is vigorously agitated.

It may be advisable, or even necessary, to effect reaction under a dry inert atmosphere, particularly where the compound of the metallic or non-metallic element and/or the compound of aluminium is readily hydrolysable, for example, where the compound of the metallic or non-metallic element is an alkoxide, e.g. where the compound is an alkoxide of silicon or titanium. Some halides of metallic or non- metallic elements, e.g. $SiCl_4$ and $TiCl_4$, are also readily hydrolysable.

The temperature at which reaction is effected will depend on the particular reactants. Thus, with reactants such as silicon tetrahalides or tetraalkoxysilanes and glycols and polyols, e.g. ethylene glycol and glycerol, reaction may be allowed to proceed at or about ambient temperature, although with other reactants, and where reaction is effected in a solvent, it may be necessary to effect reaction at elevated temperature. The reaction temperature will generally not be above the boiling point of the solvent, although a temperature above the boiling point may be used where reaction is effected under elevated pressure. Where the reaction is a transesterification reaction in which an alcohol is eliminated, e.g. as in the case of reaction of a silicon alkoxide with a hydroxy compound, the reaction temperature is preferably above the boiling point of the alcohol which is eliminated in the transesterification reaction.

Reaction may be assisted by the presence in the reaction mixture of suitable catalysts, for example, acid catalysts in the case where the reaction is a transesterification reaction. Suitable catalysts for such transesterification reactions are known in the art.

The proportion of carbon to the oxide of the metallic or non-metallic element in the coked product which is theoretically required will depend of course on the nature of the metallic or non-metallic element and on the stoichiometry of the carbothermic reaction between the carbon and the oxide. For example, where a carbide is to be produced and the oxide has the formula $MO_2$, e.g. as in the case of $SiO_2$, $TiO_2$ and $ZrO_2$, the carbothermic reaction may be represented as $$MO_2 + 3C \rightarrow MC + 2CO$$

and the molar proportion of carbon to the oxide which is theoretically required is 3 to 1. In the case of the oxides of silicon, titanium and zirconium the theoretically required proportions by weight of carbon and oxide are

| | |
|---|---|
| SiO$_2$ | 62.5% |
| carbon | 37.5% |
| TiO$_2$ | 68.9% |
| carbon | 31.1% |
| ZrO$_2$ | 77.4% |
| carbon | 22.6% |

The stoichiometry of the carbothermic reaction may be different, as in the case of reaction between carbon and the oxide of tantalum.

$$Ta_2O_5 + 7C \rightarrow 2TaC + 5CO$$

In this case the molar proportion of carbon to oxide which is theoretically required in the coked product is 7 to 1, which corresponds to 84 weight % of Ta$_2$O$_5$ and 16 weight % of carbon in the coked product produced from the polymeric product.

Where a nitride of a metallic or non-metallic element is to be produced the proportion of carbon which is required in the coked product will be different. For example, in the production of silicon nitride a mixture of silica and carbon is produced in the initial stages of the heating and this mixture is subsequently reacted with nitrogen according to an overall reaction which may be represented as $$3SiO_2 + 6C + 2N_2 \rightarrow Si_3N_4 + 6CO$$

This equation represents the overall reaction which is believed to take place and it is not intended to represent the reaction which may actually take place. It can be seen that the stoichiometric proportion which is theoretically required in the coked product is a molar proportion of silica to carbon of 1:2, that is 71:4% by weight of silica and 28.6% by weight of carbon.

In the case of the elements titanium, zirconium and hafnium the oxides of which may be represented by the formula MO$_2$ and the nitrides of which may be represented by the formula MN, the overall reaction may be represented as $$2MO_2 + 4C + N_2 \rightarrow 2MN + 4CO.$$

The stoichiometric proportion which is theoretically required in the coked product is a molar proportion of oxide to carbon of 1:2, which corresponds to the following proportions by weight

| | |
|---|---|
| TiO$_2$ | 76.9% |
| carbon | 23.1% |
| VO$_2$ | 77.5% |
| carbon | 22.5% |
| ZrO$_2$ | 83.7% |
| carbon | 16.3% |
| HfO$_2$ | 89.8% |
| carbon | 10.2% |

The proportion of carbon in the coked product may also be controlled by means other than use of an aluminium compound. For example, the production of a polymeric product, and a coked product, which contains a high proportion of carbon is favored by the use in the reaction mixture of an additional reactant which is an organic compound which contains a single hydroxyl group. Examples of such additional reactants include aliphatic alcohols, and particularly cycloaliphatic alcohols, e.g. cyclohexanol and furfuryl alcohol. Such an organic compound containing a single hydroxyl group reacts with the metallic or non-metallic compound to form a unit pendant from the chain of the polymeric product rather than a unit within the chain of the polymeric product.

In the coked product produced from the oxygen-containing polymeric product the proportion of carbon may be analysed by ignition of the coked product in an oxidising atmosphere and determination of the carbon dioxide produced, and the proportion of the oxide of the metallic or non-metallic element may be determined by chemical analysis. The relative proportions of the first and second reactants, the nature of the reactants, and the proportion of aluminium compound, should be chosen, if necessary by means of a certain amount of experimentation, in order to produce the desired proportion of carbon to oxide of the metallic or non-metallic element in the coked product produced by pyrolysis of the oxygen-containing polymeric product, this latter proportion being capable of being determined by the analytical means hereinbefore referred to.

In the process of the invention the reactants are preferably chosen to be miscible with each other or to be soluble in a common solvent. Where the reactants are miscible reaction results in production of a polymeric product of uniform composition, and of a composition which is more uniform than that produced from reactants which are not miscible with each other. Where the reactants are not miscible with each other the reaction is preferably effected in a solvent for the reactants in order that a polymeric product of uniform composition may be produced. Even where the reactants are miscible with each other the reaction may be effected in a solvent for the reactants. It is also desirable that the polymeric product be soluble in or miscible with the reactants or with the solvent in order that the polymeric product shall be in a particularly tractable form. Such a solution may be spray-dried to produce a small particle size polymeric product which may then be converted to a carbide or nitride of small and uniform particle size. The polymeric product solution may be used as an adhesive, e.g. for other refractory particles, and the product may subsequently be converted to a refractory compound. The solution may be used as a coating composition or film-forming composition from which a coating or a film of refractory compound may be produced. The product solution may be spun into the form of fibers.

Examples of compounds of metallic or non-metallic elements and of organic compounds containing hydroxyl groups which are miscible with each other include tetraethoxysilane and glycerol, tetraethoxysilane and diethylene glycol, and triethoxy boron and glycerol when heated to a slightly elevated temperature.

N-methylpyrollidone is a suitable solvent for use with a mixture of tetraethoxysilane and glycerol and with a mixture of triethoxy boron and diethylene glycol.

Ethanol is a suitable solvent for use with a variety of different compounds of metallic or nonmetallic elements and organic compounds containing hydroxyl groups, for example titanium tetrachloride and glycerol, titanium tetraethoxide and glycerol, zirconium tetrachloride and glycerol, tetraethoxysilane and cyclohexane-1,4-diol, and hafnium tetrachloride and glycerol.

In order that the polymeric product which is produced in the reaction may be in a particularly tractable form it is preferred, in the case where reaction is effected in a solvent, that the polymeric product is soluble in the solvent in which reaction is effected, or is soluble in another solvent. In order to achieve this solubility it may be desirable to effect reaction for a time less than that required to achieve complete reaction in order to avoid an undesirable amount of cross-linking which may affect the solubility of the polymeric product and which may result if reaction proceeds to, or near to, completion. Similarly, where reaction is effected in the absence of a solvent it may be desirable to effect reaction for a time less than that required to achieve complete reaction in order that the polymeric product is in a tractable form, and in particular is in a form in which it may be dissolved in a solvent prior to subsequent processing. However, where the polymeric product which is produced is intractable, and in particular is insoluble, it may for example be ground to a powder before further processing.

Before the polymeric product is used in the subsequent stages of the process of the invention it may be freed of unreacted reactants, if any, e.g. by use of a solvent which selectively removes these reactants, or by precipitation of the polymeric product from solution, or by any other convenient means. However, it may be unnecessary to remove such unreacted reactants as they may be effectively removed from the polymeric product in the subsequent stage of the process.

The invention is illustrated by the following Examples.

EXAMPLE 1

41.8 g (0.2 mole) of tetraethoxysilane and 13.65 g (0.148 mole) of glycerol were charged to a reaction vessel fitted with a stirrer and reflux condenser and a gas inlet and outlet. The reaction vessel was connected to a vacuum line and the contents of the vessel were degassed, and 0.4 g of aluminium trichloride ($3 \times 10^{-3}$ mole, 1.5% by weight of Al based on Si) were charged to the reaction vessel. The contents of the reaction vessel were stirred and heated for 1 hour until the aluminium chloride had dissolved and the vessel was further heated in order to distill off the ethanol formed by reaction between the tetraethoxysilane and the glycerol. 21.0 ml of ethanol was removed by distillation which is 90.1% of the amount which should have been formed theoretically.

The contents of the reaction vessel were allowed to cool to a gel. The gel was soluble in acetone, water and ethanol.

A weighed sample of the gel was placed in a quartz tube and the tube and contents were heated under an atmosphere of nitrogen according to the time/temperature schedule set out in the following table, and the weight loss of the sample was determined periodically.

| Temperature °C. | Time Minutes | Appearance of solid phase | % loss in weight of solid phase |
|---|---|---|---|
| 125 | 90 | — | 14.4 |
| 250 | 150 | — | 27.1 |
| 450 | 155 |  | 65.5 |
| 800 | 120 | brittle, black solid | 67.0 |

The yield of the resultant solid was 33.0% by weight of the solid charged to the quartz tube, and the solid comprised 20.4 weight % C and 70.1 weight % $SiO_2$.

By way of comparison when the above procedure was repeated except that the aluminium chloride was omitted the solid which was formed in the quartz tube contained 12.1 weight % C and 70.1 weight % $SiO_2$.

The black, brittle solid formed in the above example was pyrolysed by heating in an atmosphere of helium at a rate of increase of temperature of 5° C. per minute from ambient temperature up to 400° C. and thereafter at a rate of increase of 10° C. per minute up to 1600° C. and then at 1600° C. for 3 hours.

Examination of the resultant product by X-ray diffraction and Raman spectroscopy showed it to comprise $\beta$ SiC.

EXAMPLE 2

The procedure of Example 1 was repeated except that 0.48 g of aluminium chloride (1.8% by weight of Al based on Si) were charged to the reaction vessel, and the solid produced by heating the gel in the quartz tube was found to comprise 30.0 weight % C and 70.0 weight % $SiO_2$.

EXAMPLE 3

The procedure of Example 1 was repeated except that 0.61 g of aluminium isopropoxide (1.5% by weight of Al based on Si) were charged to the reaction vessel, and the solid produced by heating the gel in the quartz tube was found to comprise 32.8 weight % C and 64.8 weight % $SiO_2$.

EXAMPLES 4 to 6

In order to demonstrate the effect of variation of the proportion of aluminium compound to the compound of the metallic or non-metallic element on the proportion of carbon in a coked product three separate experiments (Examples 4 to 6) were carried out.

In each experiment aluminium triisopropoxide, glycerol and 200 ml of the dimethyl ether of diethylene glycol were charged to a reaction vessel as used in Example 1. The vessel and contents were degassed to a pressure of 0.1 millibars and a stream of nitrogen at atmospheric pressure was passed through the vessel. The vessel and contents were stirred and heated at a temperature of 140° to 150° C. for 5½ hours and the isopropyl alcohol produced in the reaction was distilled from the reaction vessel.

Tetraethoxysilane and 100 ml of the dimethylether of diethylene glycol were then charged to the reaction vessel and the vessel and contents were heated at 140 to 150° C. for 5½ hours and the ethanol produced in the reaction was distilled from the reaction vessel.

The solid polymer which was produced was removed from the reaction vessel, washed with dimethyl ether and dried.

A weighed sample of the polymer was placed in a quartz tube and the tube and contents were heated under an atmosphere of nitrogen at a rate of increase of temperature of 5° C. per minute up to a temperature of 800° C., and the heating was continued for 1 hour at 800° C.

The proportion of carbon in the resultant coked product was determined. The results are shown in the following table.

| Example | wt of Al triiso- propoxide g. | wt of glycerol g. | wt of tetra- ethoxy silane g. | % Al as pro- portion of Si | wt % carbon in coked product g. |
| --- | --- | --- | --- | --- | --- |
| 4 | 0.47 | 13.6 | 41.6 | 1.1 | 24.7 |
| 5 | 1.4 | 13.6 | 46.7 | 2.9 | 25.2 |
| 6 | 2.0 | 13.5 | 41.8 | 4.7 | 24.2 |
| comparison | 0 | 13.5 | 41.6 | — | 15.2 |

We claim:

1. A process for the production of a refractory compound of a metallic or non-metallic element which process comprises producing an oxygen-containing polymeric product by reacting a mixture of a first reactant which comprises at least one compound of the metallic or non-metallic element other than aluminium having two or more groups reactive with hydroxyl groups and a second reactant which comprises at least one organic compound having two or more hydroxyl groups, and pyrolysing the polymeric product, in which the reaction mixture comprises at least one aluminium compound having at least one group reactive with hydroxyl groups.

2. A process as claimed in claim 1 in which the refractory compound which is produced is a carbide or nitride of a metallic or non-metallic element.

3. A process as claimed in claim 2 for the production of a carbide of a metallic or non-metallic element which process comprises producing an oxygen-containing polymeric product by reacting a mixture of a first reactant which comprises at least one compound of a metallic or non-metallic element having two or more groups reactive with hydroxyl groups and a second reactant which comprises at least one organic compound having two or more hydroxyl groups, and pyrolysing the polymeric product in an inert atmosphere.

4. A process is claimed in claim 2 for the production of a nitride of a metallic or non-metallic element which process comprises producing an oxygen-containing polymeric product by reacting a mixture of a first reactant which comprises at least one compound of a metallic or non-metallic element having two or more groups reactive with hydroxyl groups and a second reactant which comprises at least one organic compound having two or more hydroxyl groups, and pyrolysing the polymeric product in an atmosphere which contains a reactive nitrogen compound.

5. A process as claimed in claim 1 in which in a first stage the oxygen-containing polymeric product is heated in an inert atmosphere to produce a mixture of carbon and an oxide of a metallic or non-metallic element.

6. A process as claimed in claim 5 in which the mixture of carbon and an oxide of a metallic or non-metallic element is heated at elevated temperature in an inert atmosphere to produce a carbide of the metallic or non-metallic element.

7. A process as claimed in claim 5 in which the mixture of carbon and an oxide of a metallic or non-metallic element is heated at elevated temperature in an atmosphere of a reactive nitrogen compound to produce a nitride of the metallic or non-metallic element.

8. A process as claimed in claim 1 in which the metallic or non-metallic element is selected from silicon, titanium, tantalum, zirconium, hafnium, tungsten, chromium, iron, uranium, boron, and lanthanum.

9. A process as claimed in claim 1 in which the first reactant comprises at least one compound having the formula $MX_nY_m$ where X is a group which is reactive with hydroxyl groups, Y is a group which is not reactive with hydroxyl groups, n is an integer of at least 2, and m is zero or an integer.

10. A process as claimed in claim 1 in which the second reactant comprises at least one aliphatic or cycloaliphatic organic compound having two or more hydroxyl groups.

11. A process as claimed in claim 1 in which the aluminium compound contains reactive halide or alkoxy groups.

12. A process as claimed in claim 1 in which the proportion of aluminium compound in the reaction mixture is at least 0.1%, expressed as the percentage of aluminium in the compound thereof by weight of the metallic or non-metallic element in the compound thereof.

13. A process as claimed in claim 12 in which the aluminium compound is present in the reaction mixture in a proportion of not more than 10% by weight.

14. A process as claimed in claim 12 in which the aluminium compound is present in the reaction mixture in a proportion in the range of 0.5 to 5% by weight.

15. A process as claimed in any one of claims 1 in which the reaction mixture comprises an organic compound which comprises a single hydroxyl group.

* * * * *